US008315756B2

(12) United States Patent
Caveney

(10) Patent No.: US 8,315,756 B2
(45) Date of Patent: Nov. 20, 2012

(54) SYSTEMS AND METHODS OF VEHICULAR PATH PREDICTION FOR COOPERATIVE DRIVING APPLICATIONS THROUGH DIGITAL MAP AND DYNAMIC VEHICLE MODEL FUSION

(75) Inventor: Derek Stanley Caveney, Ann Arbor, MI (US)

(73) Assignee: Toyota Motor Engineering and Manufacturing N.A. (TEMA), Erlanger, KY (US)

( * ) Notice: Subject to any disclaimer, the term of this patent is extended or adjusted under 35 U.S.C. 154(b) by 617 days.

(21) Appl. No.: 12/546,434

(22) Filed: Aug. 24, 2009

(65) Prior Publication Data

US 2011/0046843 A1 Feb. 24, 2011

(51) Int. Cl.
*G01C 22/00* (2006.01)
(52) U.S. Cl. ........................................... 701/23; 701/25
(58) Field of Classification Search .............. 701/23–25, 701/400, 408–409, 532, 301
See application file for complete search history.

(56) References Cited

U.S. PATENT DOCUMENTS

2008/0071469 A1 3/2008 Caveney et al.
2010/0121518 A1* 5/2010 Tiernan et al. .................. 701/26

OTHER PUBLICATIONS

D. Caveney, “Numerical integration for Future Vehicle Path Prediction,” in Proceedings of the American Control Conference, New York, NY, Jul. 2007, pp. 3906-3912.

Derek Caveney, “Stochastic Path Prediction Using the Unscented Transform with Numerical Integration,” in Proceedings of IEEE Intelligent Transportation Systems Conference, Seattle, WA, Sep. 2007, pp. 848-853.

J. Huang et al., “Vehicle Future Trajectory Prediction with a DGPS/INS-Based Positioning System,” in Proceedings of the American Control Conference, Minneapolis, MN, Jun. 2006, pp. 5831-5836.

P. Lytrivis, G. Thomaidis, and A. Amditis, “Cooperative Path Prediction in Vehicular Environments,” in Proceedings of the Intelligent Transportation Systems Conference, Beijing, China, Oct. 2008, pp. 803-808.

J. Du et al., “Next-Generation Autonmated Vehicle Location Systems: Positioning at the Lane Level,” IEEE Transactions on Intelligent Transportation Systems, vol. 9, No. 1, pp. 48-57, Mar. 2008.

K. Li et al., “Digital Map as a Virtual Sensor—Dynamic Road Curve Reconstruction for a Curve Speed Assistant,” Vehicle Systems Dynamics, vol. 46, No. 12., pp. 1141-1158, Dec. 2008.

U.S. Appl. No. 12/201,884, filed Aug. 29, 2008, Derek Stanley Caveney.

* cited by examiner

*Primary Examiner* — Yonel Beaulieu
(74) *Attorney, Agent, or Firm* — Oblon, Spivak, McClelland, Maier & Neustadt, L.L.P.

(57) ABSTRACT

Method and system of vehicular path prediction for a vehicle travelling on a road. A yaw rate of the vehicle is estimated over a prediction time period based on vehicle sensor information and map information for the road. Then, a further path of the vehicle on the road is predicted for the prediction time period based on a speed and a direction of the vehicle, and the estimated yaw rate. Map information includes a geometry for a portion of the road on which the vehicle is travelling, and the vehicle sensor information includes yaw rate information from a yaw rate sensor on the vehicle, and location information of the vehicle relative to the map information from a positioning device on the vehicle. A vehicle provided for path prediction includes a communication system for transmitting the predicted path to other vehicles for collision avoidance.

20 Claims, 19 Drawing Sheets

| Scenario | Time Horizon | Approach | | | |
|---|---|---|---|---|---|
| | | 1 | 2 | 3 | 4 |
| Straight | 3s | 0.89m | 1.06m (-18.3%) | 0.88m (+1.5%) | 0.88m (+1.5%) |
| | 5s | 1.47m | 2.32m (-58.6%) | 1.52m (-4.0%) | 1.52m (-4.0%) |
| | 10s | 2.07m | 8.17m (-294%) | 3.31m (-59.7%) | 3.31m (-59.7%) |
| Curve | 3s | 4.53m | 0.86m (+81.1%) | 0.78m (+82.8%) | 0.78m (+82.8%) |
| | 5s | 12.2m | 1.51m (+87.7%) | 1.00m (+91.8%) | 1.00m (+91.8%) |
| | 10s | 48.4m | 7.87m (+83.7%) | 4.85m (+90.0%) | 4.85m (+90.0%) |
| Lane Change on Straight | 3s | 1.30m | 1.50m (-15.1%) | **1.25m (4.0%)** | **0.92m (+29.3%)** |
| | 5s | 3.34m | 4.62m (-38.4%) | **3.34m (+0.0%)** | **2.06m (+38.3%)** |
| | 10s | 9.46m | 18.5m (-95.1%) | **11.4m (-19.9%)** | **8.43m (+10.9%)** |
| Lane Change on Curve | 3s | 3.19m | 1.60m (+49.8%) | **1.62m (+49.2%)** | **0.81m (+74.5%)** |
| | 5s | 9.38m | 5.10m (+45.7%) | **3.27m (+65.1%)** | **1.16m (+87.7%)** |
| | 10s | 42.3m | 18.5m (+56.1%) | **7.41m (+82.4%)** | **3.11m (+92.6%)** |
| Overall | 3s | 3.11m | 1.53m (+50.8%) | 1.40m (+55.0%) | 1.39m (+55.3%) |
| | 5s | 7.90m | 3.52m (+55.5%) | 2.55m (+67.7%) | 2.50m (+68.4%) |
| | 10s | 30.3m | 15.1m (+50.0%) | 7.92m (+73.9%) | 7.80m (+74.3%) |

*Fig. 3*

| Characteristic | Time Horizon | Approach | | | |
|---|---|---|---|---|---|
| | | 1 | 2 | 3 | 4 |
| Constant Velocity | 3s | 3.11m | 1.66m (+46.8%) | 1.57m (+49.6%) | 1.57m (+49.6%) |
| | 5s | 7.65m | 3.92m (+48.8%) | 2.90m (+62.0%) | 2.69m (+64.7%) |
| | 10s | 27.5m | 14.9m (+45.6%) | **6.93m (+74.8%)** | **5.96m (+78.3%)** |
| Moderate Density | 3s | 3.37m | 1.80m (+46.6%) | 1.71m (+49.1%) | 1.59m (+52.8%) |
| | 5s | 8.47m | 4.83m (+43.0%) | **3.45m (+59.2%)** | **3.13m (+63.0%)** |
| | 10s | 31.3m | 19.4m (+38.1%) | **10.2m (+67.5%)** | **9.18m (+70.7%)** |
| Aggressive | 3s | 4.02m | 2.13m (+47.0%) | 2.05m (+49.0%) | 2.02m (+50.0%) |
| | 5s | 10.6m | 6.22m (+41.1%) | 5.31m (+49.7%) | 5.22m (+50.6%) |
| | 10s | 38.4m | 31.9m (+17.0%) | 26.2m (+31.7%) | 26.1m (+32.1%) |

*Fig. 4*

| Environment | Time Horizon | Approach | | | |
|---|---|---|---|---|---|
| | | 1 | 2 | 3 | 4 |
| Highway | 3s | 3.11m | 1.53m (+50.8%) | 1.40m (+55.0%) | **1.39m (+55.3%)** |
| | 5s | 7.90m | 3.52m (+55.5%) | 2.55m (+67.7%) | **2.50m (+68.4%)** |
| | 10s | 30.3m | 15.1m (+50.0%) | 7.92m (+73.9%) | **7.80m (+74.3%)** |
| City | 3s | 2.81m | 2.08m (+26.2%) | 2.11m (+25.1%) | **2.11m (+25.1%)** |
| | 5s | 6.30m | 4.84m (+23.1%) | 3.79m (+39.8%) | **3.73m (+40.8%)** |
| | 10s | 19.7m | 21.1m (-6.9%) | 10.1m (+49.0%) | 9.84m (+50.2%) |
| Neighborhood | 3s | 6.50m | 3.06m (+52.9%) | 3.53m (+45.8%) | **3.53m (+45.7%)** |
| | 5s | 16.6m | 10.9m (+34.2%) | 9.30m (+44.0%) | 9.30m (+44.0%) |
| | 10s | 56.6m | 56.2m (+0.1%) | 33.5m (+40.8%) | 33.4m (+41.0%) |

*Fig. 6*

SYSTEMS AND METHODS OF VEHICULAR PATH PREDICTION FOR COOPERATIVE DRIVING APPLICATIONS THROUGH DIGITAL MAP AND DYNAMIC VEHICLE MODEL FUSION

BACKGROUND

Previous work in vehicular path prediction for collision avoidance has primarily investigated vehicular models without incorporating digital map data.

Lytrivis et al. investigated linear vehicle models and Kalman filtering for short time-horizon predictions while using digital map information for longer time-horizon predictions as discussed by Panagiotis Lytrivis, Georgios Thomaidis, and Angelos Amditis, "Cooperative path prediction in vehicular environments," in *Proceedings of the Intelligent Transportation Systems Conference*, Beijing, China, October 2008, pp. 803-808 (hereinafter Lytrivis et al.). Lytrivis et al. is incorporated herein by reference.

In Lytrivis et al., map information is not incorporated into the short time-horizon predictions. The accuracy of such predictions directly affects the reliability of the cooperative driving applications.

SUMMARY OF THE INVENTION

In one aspect a method of vehicular path prediction for a vehicle travelling on a road is provided. In another aspect, the method is performed by a processor by executing computer executable instructions embodied on a computer readable medium.

In these aspects, the method includes estimating a yaw rate of the vehicle over a prediction time period based on vehicle sensor information and map information for the road.

Then, a further path of the vehicle on the road is predicted for the prediction time period based on a speed and a direction of the vehicle, and the estimated yaw rate.

In preferred aspects, the map information includes a geometry for a portion of the road on which the vehicle is travelling, and the vehicle sensor information includes yaw rate information from a yaw rate sensor on the vehicle, and location information of the vehicle relative to the map information from a positioning device on the vehicle.

In another aspect, a vehicle is provided, which includes a yaw rate sensor to produce yaw rate information of the vehicle, a positioning device to determine a global position of the vehicle relative to map information for a road, and a processing device. The processing device is to estimate a yaw rate of the vehicle over a prediction time period based on vehicle sensor information including the produced yaw rate information from the yaw rate sensor and the map information for the road. The processing device is further to predict a future path of the vehicle on the road for the prediction time period based on a speed and a direction of the vehicle, and the estimated yaw rate. In a preferred aspect, the map information includes a geometry for a portion of the road on which the vehicle is travelling.

In the above aspects, it is preferred that the estimated yaw rate is determined based on an instantaneous radius of curvature of the vehicle, based on the vehicle's position on a road. Specifically, the instantaneous radius of curvature is the inverse of a combined curvature. The combined curvature is a combination of a road curvature based on the map information, specifically the geometry of the road on which the vehicle is travelling, and a maneuvering curvature based on a vehicle maneuver. The vehicle maneuver is a maneuver which exceeds a predetermined lane of vehicular travel on the road, and is preferably determined based on vehicle sensor information. In one aspect, the maneuvering curvature is based on a maneuvering time period for completing the vehicle maneuver.

Also, in the above aspects, it is preferred that communication of the predicted path of the vehicle is provided to other vehicles, especially nearby vehicles, as a component of a collision avoidance system. Communication may be made by V2V or I2V communication protocols, as discussed below.

The foregoing paragraphs have been provided by way of general introduction, and are not intended to limit the scope of the claims. The presently preferred embodiments, together with further advantages, will be best understood by reference to the following detailed description taken in conjunction with the accompanying drawings. Thus, other aspects and benefits of the invention will be inherent in light of the following.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a table of position accuracy and percentage improvement comparison information for four scenarios;

FIG. 4 shows a table of position accuracy and percentage improvement comparison information for three highway driving characteristics;

FIG. 6 shows a table of position accuracy and percentage improvement comparison information for three driving environments;

DETAILED DESCRIPTION OF THE PREFERRED EMBODIMENTS

Figure 1:
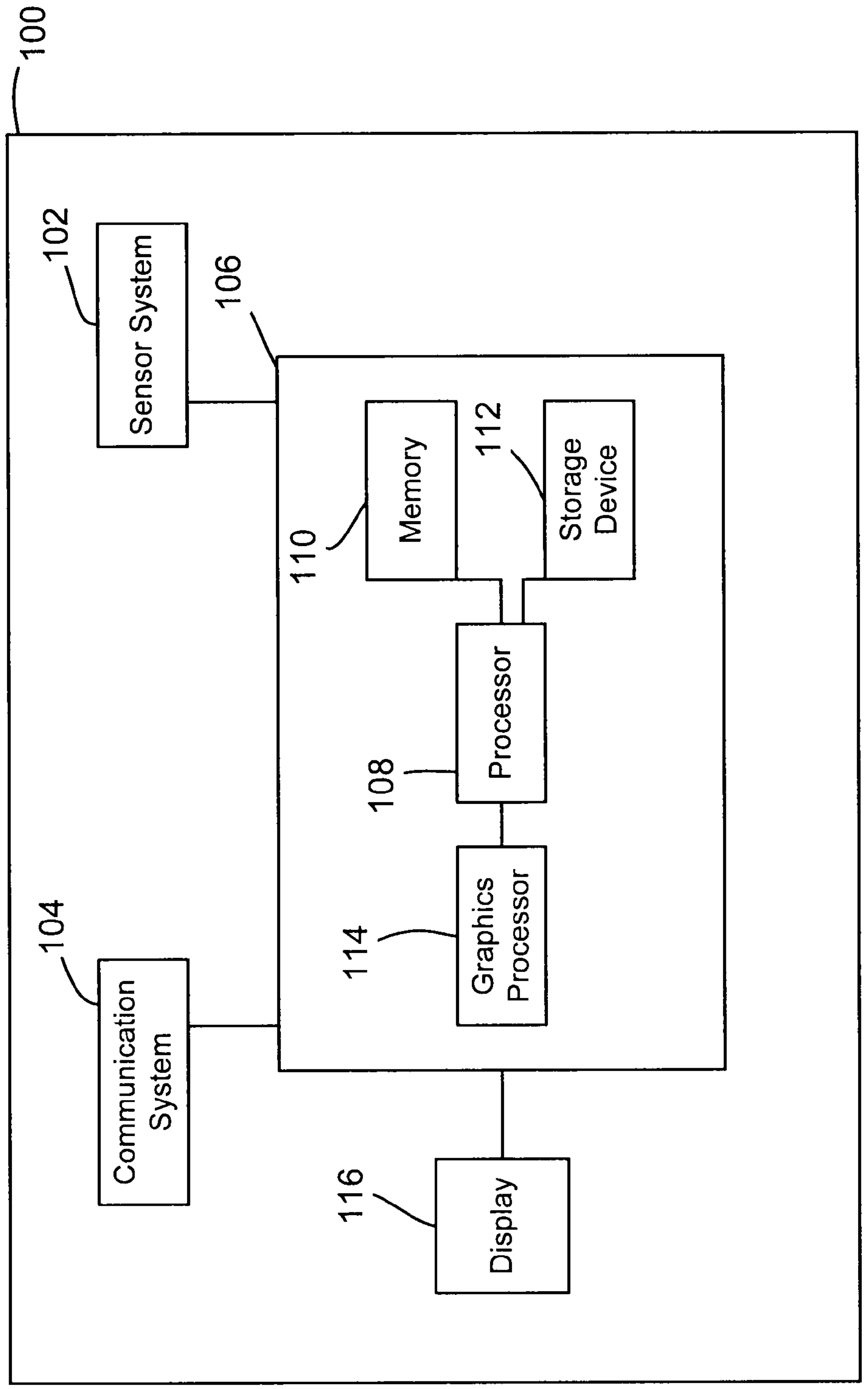
FIG. 1 depicts a block diagram of a vehicle with computer hardware integration.

Vehicular path prediction for collision avoidance without incorporating digital map data has been discussed by Derek Caveney, "Numerical integration for future vehicle path prediction," in *Proceedings of the American Control Conference*, New York, N.Y., July 2007, pp. 3906-3912 (hereinafter Caveney I); Derek Caveney, "Stochastic path prediction using the unscented transform with numerical integration," in *Proceedings of IEEE Intelligent Transportation Systems Conference*, Seattle, Wash., September 20D7, pp. 848-853 (hereinafter Caveney II); and Jihua Huang and Han-Shue Tan, "Vehicle future trajectory prediction with a DGPS/INS-based positioning system," in *Proceedings of the American Control Conference*, Minneapolis, Minn., June 2006, pp. 5831-5836

(hereinafter Huang et al.). Caveney I, Caveney II, and Huang et al. are incorporated herein by reference.

Caveney I corresponds to U.S. application Ser. No. 11/554,150, filed in Oct. 30, 2006, which claims priority to U.S. Provisional Patent Application Ser. No. 60/825,589, filed Sep. 14, 2006. U.S. application Ser. No. 11/554,150 and U.S. Provisional Patent Application Ser. No. 60/825,589 are incorporated herein by reference.

Caveney II corresponds to U.S. application Ser. No. 12/201,884, filed on Aug. 29, 2008, which is incorporated herein by reference.

Research into combining global navigation satellite systems (GNSS) with wireless communication technologies is enabling future cooperative driving applications with benefits to safety, comfort, and mobility services. Comfort and mobility services, which are directed at reducing a driver's work load and increasing traffic flow, respectively, are aspects of applications for such wireless communications in production vehicles. Such applications may require infrequent communication updates and communication latency can thus be tolerated.

On the other hand, safety applications require high-frequency, low-latency communications that contain precise vehicle positioning and orientation information. Although toughest on the communications requirements, it is safety applications that can leverage the abundant amount of vehicle specific information in their message payloads. Some cooperative mobility applications may be addressed by communication media (e.g., WiMAX—Worldwide Interoperability for Microwave Access, based on the IEEE 802.16 standard), which is independent of the vehicle type or original equipment manufacture (OEM) specific vehicle integration. However, safety applications employ communication media (e.g., DSRC—dedicated short-range communications) with standardized message formats (e.g., SAE J2735—Society of Automotive Engineers standard J2735) and security-layer definitions (i.e., the IEEE 1609.2 standard).

SAE J2735 includes aspects of defining message sets, data-frames and data-elements used by applications to exchange data over DSRC/WAVE (Wireless Access in Vehicular Environment standard, including IEEE 1609 standard), as well as other, communication protocols. SAE J2735 also includes various message categories, including general, safety, geolocation, traveler information, and electronic payment.

Discussed herein is a fusion technique for combining digital map data with vehicle specific measurements (e.g., controller-area network—CAN, and global positioning system—GPS) to produce accurate short-time (i.e., 3- to 10-second) horizon path predictions. These path predictions incorporate dynamic vehicle models that are integrated over the time horizon to provide a continuous path prediction over the entire time horizon, and not just predicted vehicle positions at the end of the time horizon. The purpose of one vehicle sharing such path predictions with another vehicle through Vehicle-to-Vehicle (V2V) communications, or with infrastructure, through Infrastructure-to-Vehicle (I2V) communications is to allow neighboring vehicles to independently identify and resolve future potential path conflicts. This information is meant to augment information available for autonomous sensors such as radars, lidars, cameras, and other on-vehicle sensor equipment. Such autonomous sensors have limited sensing range and limited field of view in comparison to sharing information through wireless communications.

In one aspect, a principle enabling technology of cooperative driving applications is the GNSS positioning system (e.g., GPS). Affordable and accurate positioning such as GPS positioning is important for a successful deployment of cooperative driving applications. With an imprecise estimate of a vehicle's position in world coordinates (e.g., latitude/longitude, Universal Transverse Mercator—UTM), there is little need to share the subsequently inaccurate path predictions derived from this estimate for the purpose of collision avoidance. Two additional benefits of GNSS, which are fundamental to the cooperative driving environment, are that the GNSS satellites can provide a common global clock and a common Earth Coordinate Frame for applications running distributively on multiple vehicles.

Referring now to the drawings, wherein like reference numerals designate identical or corresponding parts throughout the several views.

In one aspect, as depicted in FIG. 1, the processes discussed below are performed onboard a vehicle 100 equipped with a sensor system 102 and a communication system 104. The sensor system 102 preferably includes radars, lidars, cameras, a GPS receiver, a differential global positioning system (DGPS) receiver, yaw gyroscopic sensors, accelerometers, vehicle speed sensors, a vehicle mass sensor, a wheel base sensor, and a steering ratio sensor. The previously disclosed list of sensors is not exhaustive of all of the sensors which can be included as part of the sensor system 102. Likewise, depending on specific implementations, not all of the sensors may be necessary and/or included onboard the vehicle 100.

The communication system 104 includes communication radios, transceivers and antennas for communication via at least one of the aforementioned communication standards. Preferably, the communication system 104 includes transceivers to communicate, as noted above, via a V2V and/or I2V communication protocols.

The sensor system 102 and the communication system 104 are connected to a computer readable medium such as components of a processing device 106 in a preferred aspect. The processing device 106 can be programmed in a variety of different computer languages, including C++. The processing device 106 preferably includes a processor 108 to execute the processes discussed below, random access electronic memory 110, and a storage device 112, such as a hard disk drive or a solid-state drive, for electronically storing and retrieving digital map data and information, including computer executable instructions related to the processes discussed herein. The processing device also preferably includes a graphics processor 114. In some aspects, an application specific integrated controller is also used. Processed data, results, and/or navigation information, including transmissions received from other vehicles, can be processed by the processing device 106 and displayed using the graphics processor 114 and the display device 116. The display device 116 is preferably a liquid crystal device (LCD), but other types of displays can be used, including organic light emitting diode (OLED) displays.

In other aspects, computer readable media include one or more processors, executing programs stored in one or more storage media, and can be employed as any of the devices discussed above to perform any of the functions discussed above and below. Exemplary processors/microprocessor and storage medium(s) are listed herein and should be understood by one of ordinary skill in the pertinent art as non-limiting. Microprocessors used to perform the methods discussed herein could utilize a computer readable storage medium, such as a memory (e.g. ROM, EPROM, EEPROM, flash memory, static memory, DRAM, SDRAM, and their equivalents), but, in an alternate aspect, could further include or exclusively include a logic device for augmenting or fully implementing the functions described herein. Such a logic device includes, but is not limited to, an application-specific integrated circuit (ASIC), a field programmable gate array (FPGA), a generic-array of logic (GAL), a Central Processing Unit (CPU), and their equivalents. The microprocessors can be separate devices or a single processing mechanism.

Discussed below is an overview of preferred aspects of methods used to fuse digital map information with nonlinear vehicle dynamic models.

In one aspect, a vehicle dynamics model is numerically integrated to generate a path prediction. This model can contain vehicle-specific parameters, such as mass, wheel base, and steering ratio of a vehicle. Models such as the kinematic acceleration, kinematic unicycle, kinematic bicycle, linear tire-stiffness bicycle, or four-wheel with roll and pitch of the vehicle, can be chosen. As discussed herein, the nonlinear unicycle model is chosen:

$$\dot{x}(t) = \begin{bmatrix} \dot{x}(t) \\ \dot{y}(t) \\ \dot{\psi}(t) \\ \dot{\upsilon}_x(t) \end{bmatrix} = \begin{bmatrix} \upsilon_x(t)\cos(\psi(t)) \\ \upsilon_x(t)\sin(\psi(t)) \\ \omega(t) \\ a_x(t) \end{bmatrix}, \quad \text{(Equation 1)}$$

where x, y, and $\psi$ are with respect to the earth coordinate frame, and $v_x$ and $\alpha_x$ are with respect to the vehicle fixed coordinate frame. x is the UTM X position in meters, y is UTM Y position in meters, and $\psi$ is the vehicle heading in radians taken positive counter-clockwise from the x axis. $v_x$ is the longitudinal velocity of the vehicle in meters per second and $\alpha_x$ is the longitudinal acceleration of the vehicle in meters per second squared. As used herein, $\alpha_x(t)$ is assumed constant over the prediction horizon T, with a value $\alpha_x(t)=\alpha_x[0]\forall t \in [0, T]$ taken from an accelerometer measurement or differentiated wheel-speeds.

The vehicle's yaw rate can also be assumed constant over the prediction horizon T, with a value $\omega(t)=\omega[0]\forall t \in [0, T]$ taken from a yaw gyroscopic device. However, as discussed herein, an estimated yaw rate over the prediction horizon is used. This estimated yaw rate, $\omega(t)=v_x(t)/R(t)$, is generated from the instantaneous radius of curvature R(t) and the longitudinal velocity $v_x(t)$ of the vehicle. The instantaneous radius of curvature is defined as the inverse of the combined curvature C(t), (i.e., C(t)=1/R(t)). The combined curvature represents the sum of expected curvature of the vehicle from the road geometry/curvature $C_r(t)$, and the vehicle's maneuvering relative to the road geometry, $C_v(t)$, such as a lane change. Thus, in one aspect, the combined curvature is defined as $$C(t) \stackrel{\Delta}{=} C_r(t)+C_v(t) \quad \text{(Equation 2).}$$

Figure 2A:
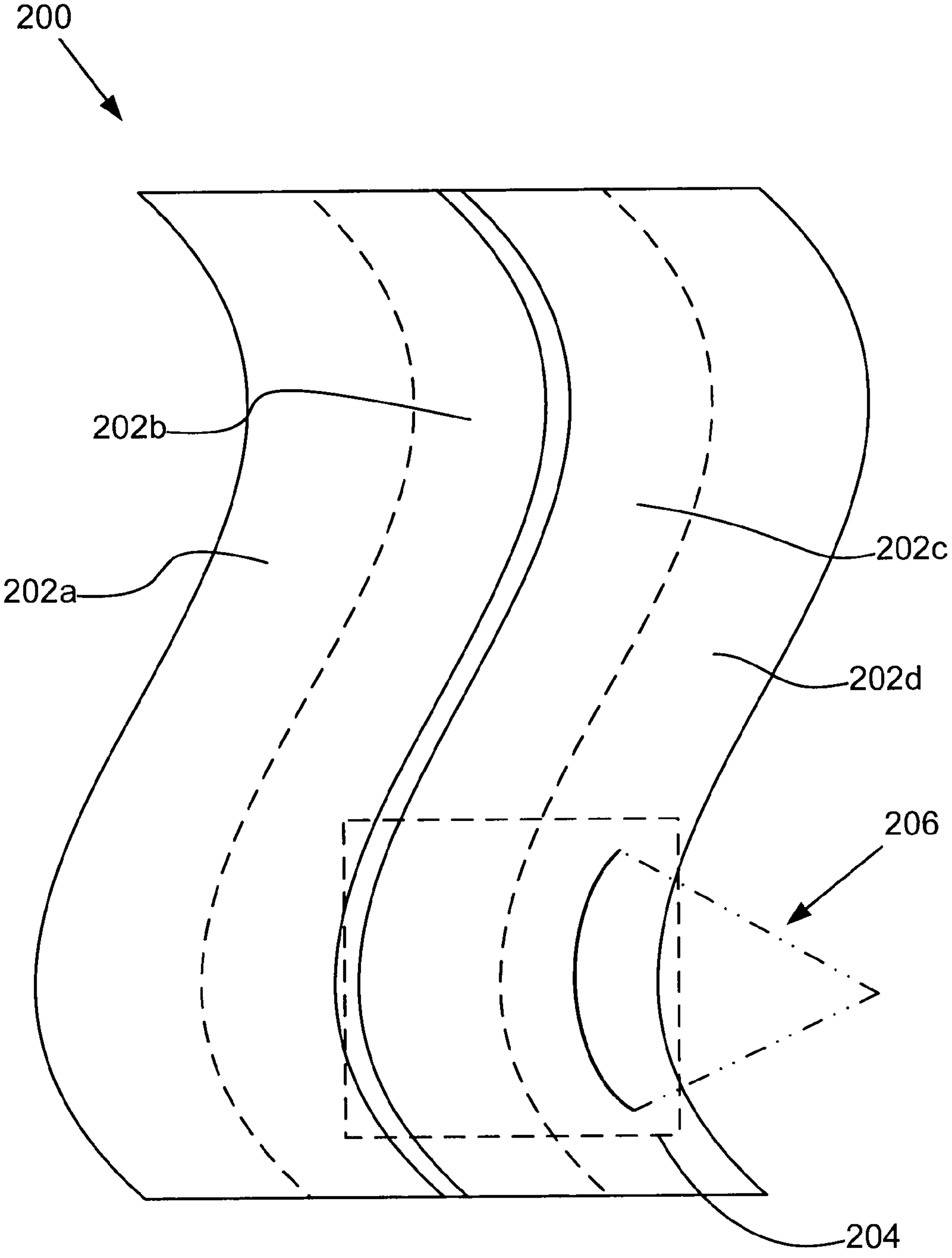
FIG. 2*a* illustrates a curved road.

Referring now to FIG. 2*a*, a curved road 200 is shown having lanes 202*a-d*. A section 204 of the curved road 200 has an instantaneous radius of curvature 206, which is defined as $$R_r(t) = \frac{1}{C_r(t)}.$$

Figure 2B:
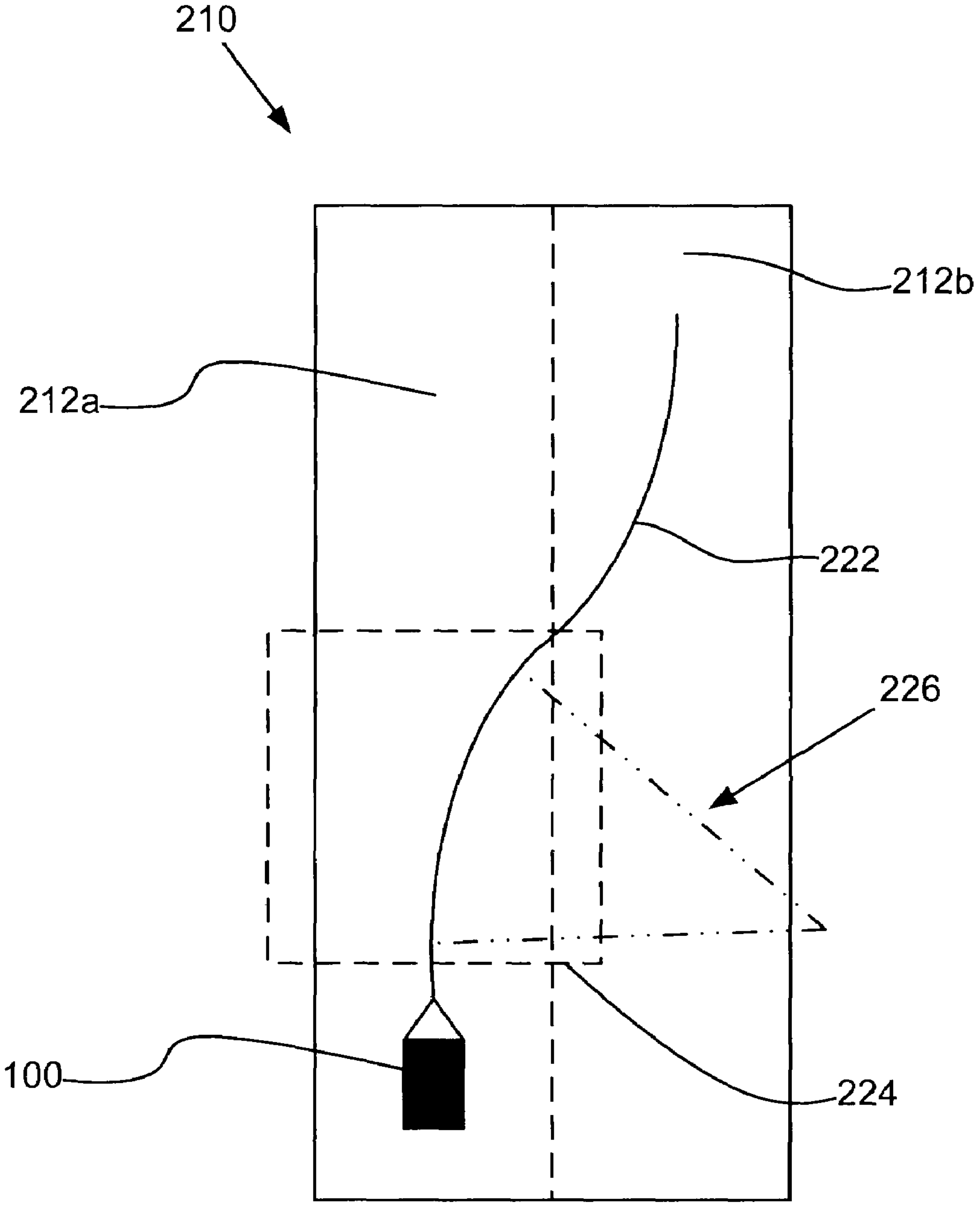
FIG. 2*b* illustrates a vehicle changing lanes on a straight road by taking a curved path.

As shown in FIG. 2*b*, along a straight road 210 having a first lane 212*a* and a second lane 212*b*, a vehicle 100 takes a path 222 in changing from the first lane 212*a* to the second lane 212*b*. A portion 224 of the path 222 has an instantaneous radius of curvature 226, which is defined as $$R_v(t) = \frac{1}{C_v(t)}.$$

Figure 2C:
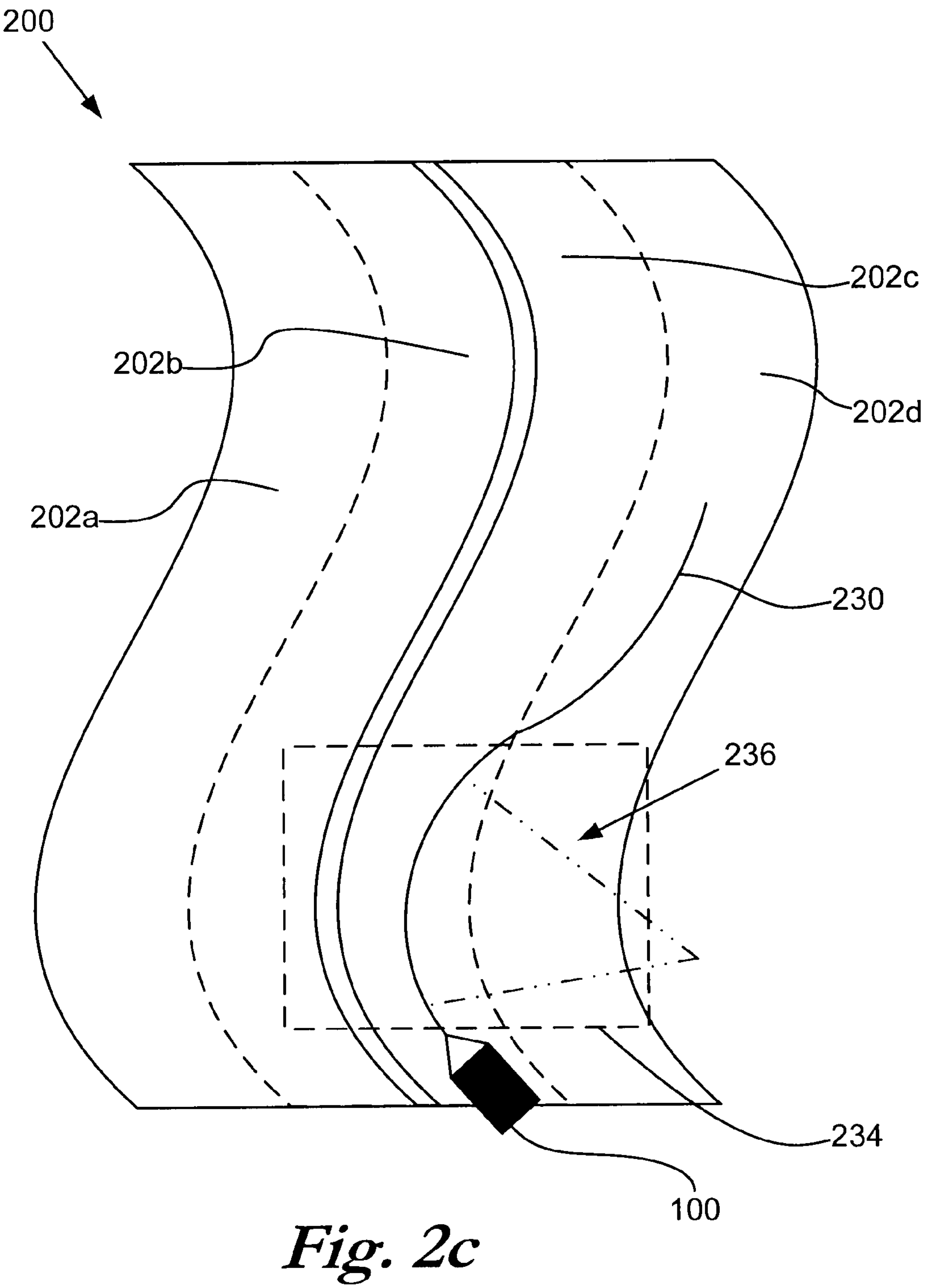
FIG. 2*c* illustrates a vehicle changing lanes on a curved road by taking a curved path.

In FIG. 2*c*, the vehicle 100 is shown taking a path 230 along the curved road 200. The vehicle takes the path 230 in changing from the lane 202*c* to the lane 202*d*. A portion 234 of the path 230 has an instantaneous radius of curvature 236, which is defined as $$R(t) = \frac{1}{C(t)} = \frac{1}{C_r(t) + C_v(t)}.$$

The combined curvature, and thus the estimated yaw rate, is not assumed constant over the prediction horizon. The time-varying curvature information is explicitly included (i.e., $\omega(t)=C(t)v_x(t)$) in the numerical integration of the dynamical Equation 1 for producing the path prediction. This represents the fusion of the dynamical vehicle model and the digital map information.

A discussion of the road curvature $C_r(t)$ follows. Digital map information, in one aspect, is used for map matching a current GPS position of the vehicle to the nearest roadway and then to return the curvature, $C_r(t)$, for the matched waypoint that is nearest to the current GPS position. A lane-level map matching approach which is compatible with the disclosed processes is detailed in Jie Du and M. J. Barth, "Next-generation automated vehicle location systems: Positioning at the lane level," *IEEE Transactions on Intelligent Transportation Systems*, vol. 9, no. 1, pp. 48-57, March 2008 (hereinafter Du et al.), which is incorporated herein by reference.

An aspect of this disclosure is emphasized on the use of road curvature information available after a current vehicle position is matched to a nearest waypoint on the map. Linear interpolation of the curvature between two nearest waypoints can be used because lane curvature should not vary too much between consecutive waypoints. Consequently, map matching precision can potentially be of lower quality and map resolution can potentially be coarser. Before map matching, road map data (e.g., ESRI shapefiles from ArcGIS geographic information system software suited products produced by ESRI —Environmental Systems Research Institute, Inc. of Redlands, California, or similar data files) are interpreted offline to determine lane curvature information for all GPS waypoints given in the map. Kang Li, Han-Shue Tan, James A. Misener, and J. Karl Hedrick, "Digital map as a virtual sensor-dynamic road curve reconstruction for a curve speed assistant," *Vehicle Systems Dynamics*, vol. 46, issue 12, pp. 1141-1158, December 2008, which is incorporated herein by reference, provides a discussion on road curvature generation algorithms. Curvature information is utilized within the numerical integrator, which map matches each predicted path position with its expected road curvature while integrating the dynamical model, Equation 1.

A discussion of lane-change curvature, $C_v(t)$, follows. Most lane changes take between 3-7 seconds. As discussed herein, lane-changes are assumed to take the average of 5 seconds. Lane changes are detected through a combination of yaw rate information from a yaw-rate sensor, and a relative yaw determination based on road geometry and a current heading of the vehicle. Additionally, steering wheel angle and steering wheel angle rate measurements from sensors can be used to detect intended lane changes.

A nominal lane-change curvature profile is generated given a current speed of the vehicle and the assumed 5-second duration of a lane change. Once a lane change is detected, the path prediction integrator maintains a completion percentage of the lane-change maneuver. The amount of lane-change curvature added to the combined curvature, C(t), is a function of this completion percentage.

In some aspects, besides the logic used to detect a lane-change, variables which effect the quality of the above processes include the accuracy of the digital map, the precision of map matching, and the precision of the vehicle sensor measurements. In preferred aspects, accurate curvature information is available within a digital map. However, map matching to the digital map is a function, e.g., of at least GPS receiver quality, the resolution of the map, the fusion of GPS information with inertial measurement units (IMUs) to provide accurate position estimates even during times of GPS signal outage, and the algorithms used to match this position to the map. Furthermore, current production level vehicle sensors are low-cost and provide only sufficient quality for vehicle stability systems. It is preferred that higher quality vehicle sensors be implemented, than what is in current production, for both GPS/IMU integration and initialization (i.e., $\alpha_x[0]$) of path prediction routines.

In should be appreciated that, as noted above, a constant duration (i.e., 5 seconds) profile for lane changes was assumed. This profile can be modified to be driver or vehicle specific. As discussed herein, it is only velocity specific. However, it should be appreciated that the duration profile can be modified to be driver or vehicle specific, or be specific to a longer or shorter duration period.

It should also be appreciated that the processes discussed herein, and the associated measurements (e.g., UTM X/Y/ψ)) assume a 2-dimensional flat ground. Three-dimensional models, GPS altitude measurements, and 6-degree-of-freedom IMUs should be considered if road slope and slant are significant.

An alternative to integrating vehicle dynamical models over a time horizon is to utilize only a digital map and DGPS, or similar, receiver. For example, using only the current speed and acceleration of the vehicle, a path prediction can be generated by marching along the centerline waypoints of the current lane specified by the digital map for the distance specified by $$d(T)=v_x[0]\cdot T+0.5^2\alpha_x[0]\cdot T^2 \quad \text{(Equation 3)},$$

where T is the prediction time horizon. This requires lane-level map matching and lane-level digital maps, whereas the previously discussed approach operates sufficiently using merely road-level curvature information. This is because the proposed approach is less susceptible to map matching inaccuracies as a result of road curvature changing at a much slower rate than the UTM coordinates used to define the road map. Accordingly, it should be appreciated that lane-level curvature information improves previously proposed approaches. Furthermore, a map-only approach is only as accurate as the map resolution, and additional logic would be required to accommodate detected lane changes and where-in-the-lane the vehicle will be at the end of the prediction horizon.

A comparison of four methods is presented to evaluate the effectiveness of incorporating digital map data with vehicle dynamical models for path prediction. All four approaches use the unicycle model of Equation 1 and are defined by the following differences, Approach 1: $\omega(t)=0$, for all t, and $\alpha_x(t)=0$, for all t;
Approach 2: $\omega(t)=\omega[0]$, for all t, and $\alpha_x(t)=\alpha_x[0]$, for all t;
Approach 3: $\omega(t)=C_r(t)v_x(t)$, and $\alpha_x(t)=\alpha_x[0]$, for all t; and
Approach 4: $\omega(t)=C(t)v_x(t)$, and $\alpha_x(t)=\alpha_x[0]$, for all t.

For each of these first, second, third and fourth approaches, the longitudinal acceleration value is assumed constant over the prediction horizon. A model for predicted driver longitudinal behavior would be required to include a time-varying expected longitudinal acceleration over the prediction horizon. For example, this driver model could encompass expected responses of the driver to the presence of preceding vehicles or the road curvature itself (e.g., slowing for a tight curve). The effect of the above is discussed below.

The four approaches were compared within different driving environments (i.e., highway, city, and neighborhood), different driving behaviors (i.e., constant velocity, moderate density traffic, aggressive driving), and different driving maneuvers (e.g., lane-changing on straight and curving road geometry). Real vehicle data was collected using a DGPS receiver, and CAN-based wheel speed and yaw rate measurements. Although, CAN-based longitudinal accelerometer measurements were available, longitudinal accelerations were instead estimated by low-pass filtering numerically differentiated wheel-speed measurements. In general, automotive-grade accelerometers provide worse estimates of low-to-moderate longitudinal acceleration on dry roads than differentiated wheel speeds, especially on non-flat terrain or during large pitching (i.e., braking) motions.

FIG. 3 shows a table comparing first, second, third and fourth approaches during highway driving. The percentage improvement shown in parentheses is relative to the first approach. During straight road geometry, omitting map data and yaw rate estimates is possible. However, predictions are off by at least a lane width (i.e., 3.6 m), even for short time horizons, in curves. Incorporating yaw rate measurements helps the second approach reduce errors while in curves, but transitions into curves and lane changes are problematic. Using road map information further improves predictions during transitions in the road geometry, with 5-second prediction errors reducing to sub-lane width values in all maneuvers. Finally, the addition of lane-changing curvature allows sub-meter 3-second prediction errors in isolated maneuvers. Noteworthy from the table shown in FIG. 3 is the ability of the fourth approach to predict the path of the lane change occurring along a curved road. The improvement by including both road and maneuver curvature is evident. Overall, the fourth approach, which includes both road and lane-changing curvature, allows for 10-second road level, 5-second lane level, and 3-second where-in-lane level path predictions for all highway driving, regardless of lateral maneuvers made by the driver.

It should be appreciated that the table shown in FIG. 3 is drawn from highway driving with low traffic density insignificantly influencing the driver's input. Isolated lane changes were made at only a few random instances.

The table shown in FIG. 4 extends the analysis to include different driver characteristics while driving on the highway. The first row shows overall path prediction performance for the same stretch of road when the vehicle maintains constant velocity, while performing multiple lane changes around groups of vehicles. The second row shows overall performance in denser traffic, where the driver performed more lane changes to negotiate the traffic while still maintaining roughly a constant speed. The final row shows the path prediction errors for an aggressive driver who drove the same stretch of highway with dense traffic while rapidly accelerating and decelerating between groups of preceding vehicles.

From the table shown in FIG. 4, it can bee seen that vehicles maintaining a constant velocity have significantly better long time horizon predictions. Furthermore, vehicles with aggressive longitudinal behavior make long time horizon prediction unsuitable. During the near-constant velocity driving of the first two rows, the increase of lane change occurrences distinctly shows the benefit of including lane change curvature modeling. Here, this approach is more than 1 meter improved in 10-second predictions and 30 centimeter improved in 5-second predictions for highway driving. However, with aggressive driving, the improvement of lateral positioning predictions available through inclusion of the lane change modeling is negated by large longitudinal positioning errors.

Figure 5:
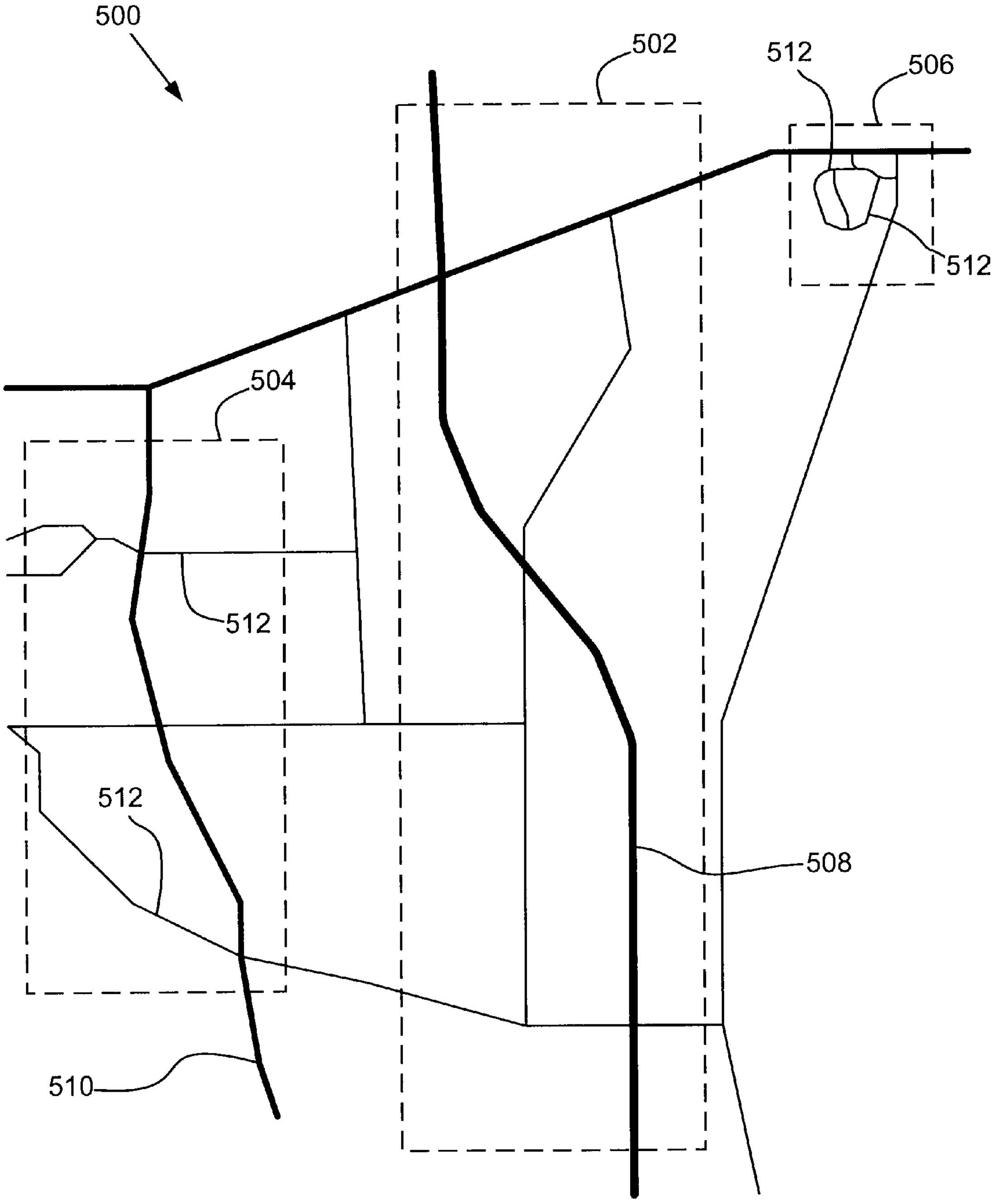
FIG. 5 illustrates a map including a neighborhood region, a city region and a highway region.
Figure 7A:
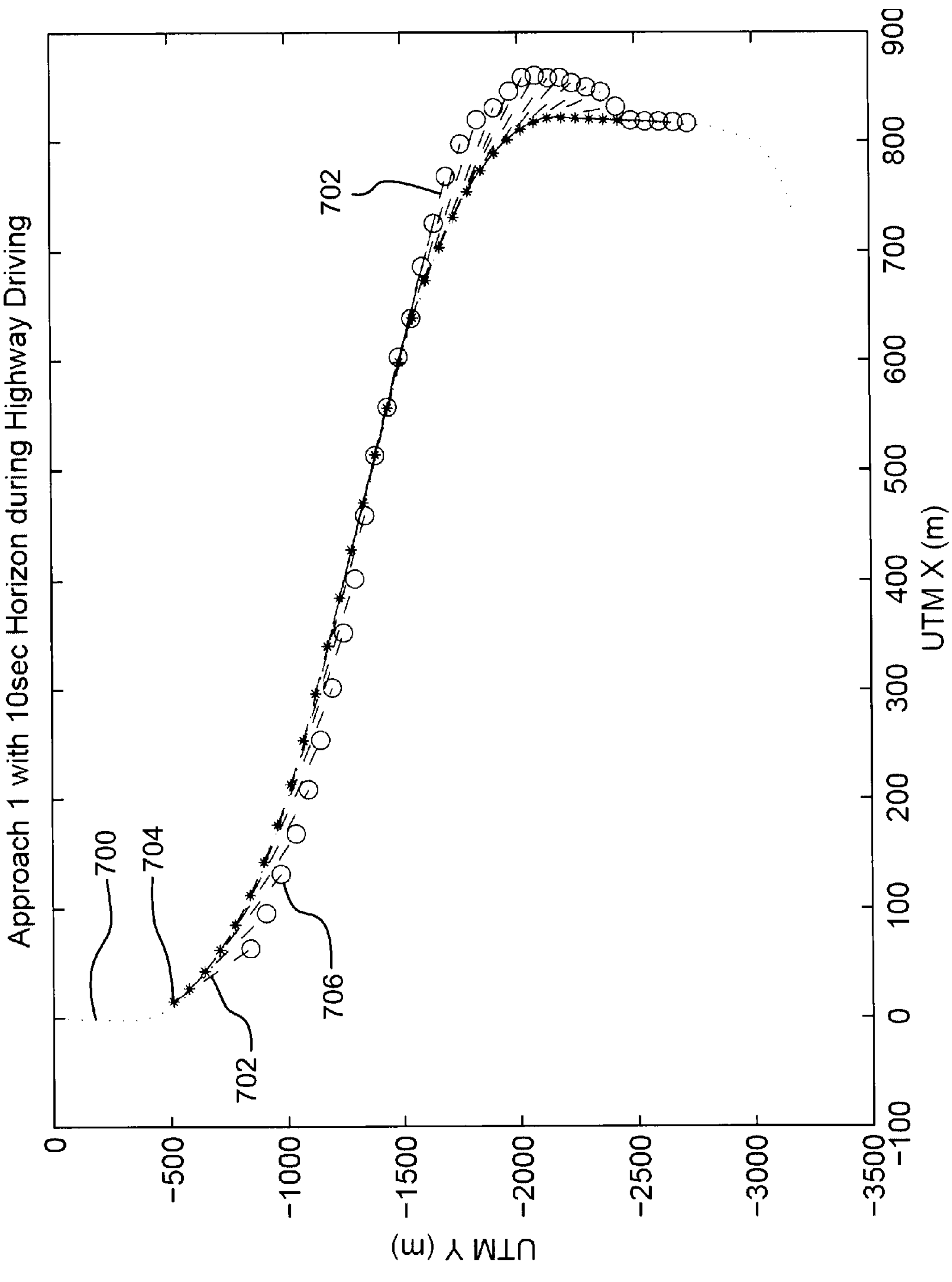
FIGS. 7*a*-7*d* show data corresponding to the highway region shown in FIG. 5.
Figure 7B:
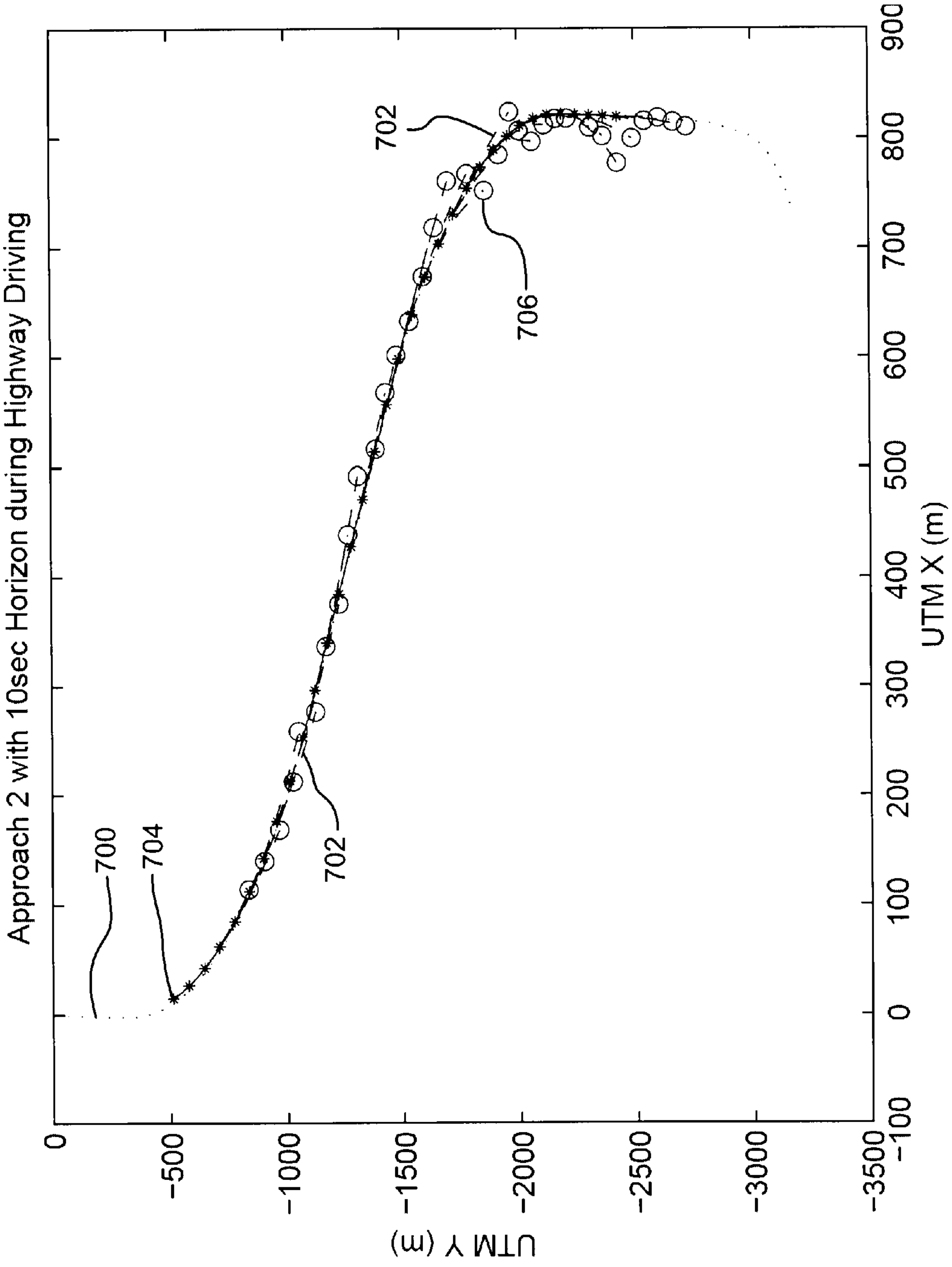
Figure 7C:
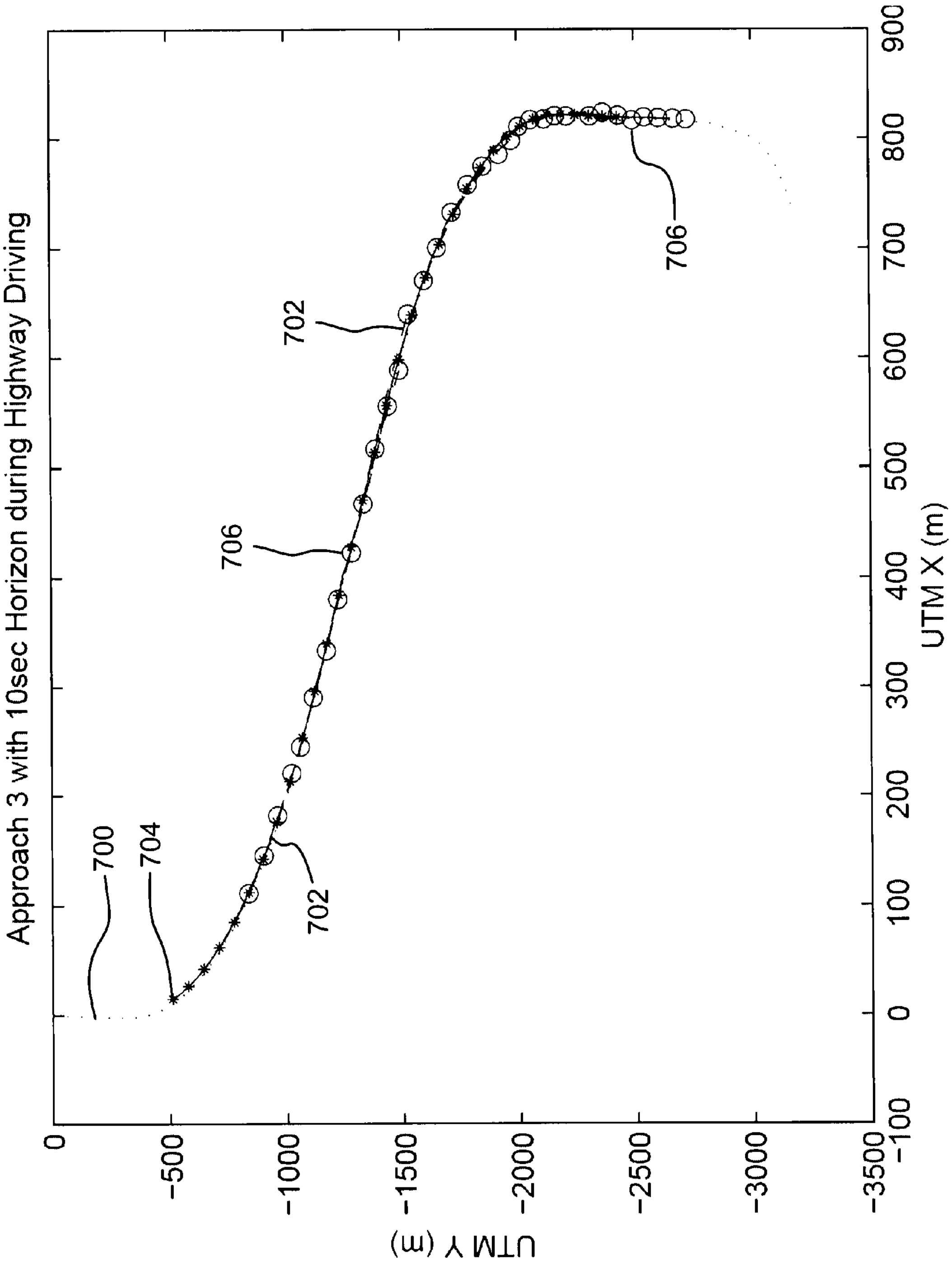
Figure 7D:
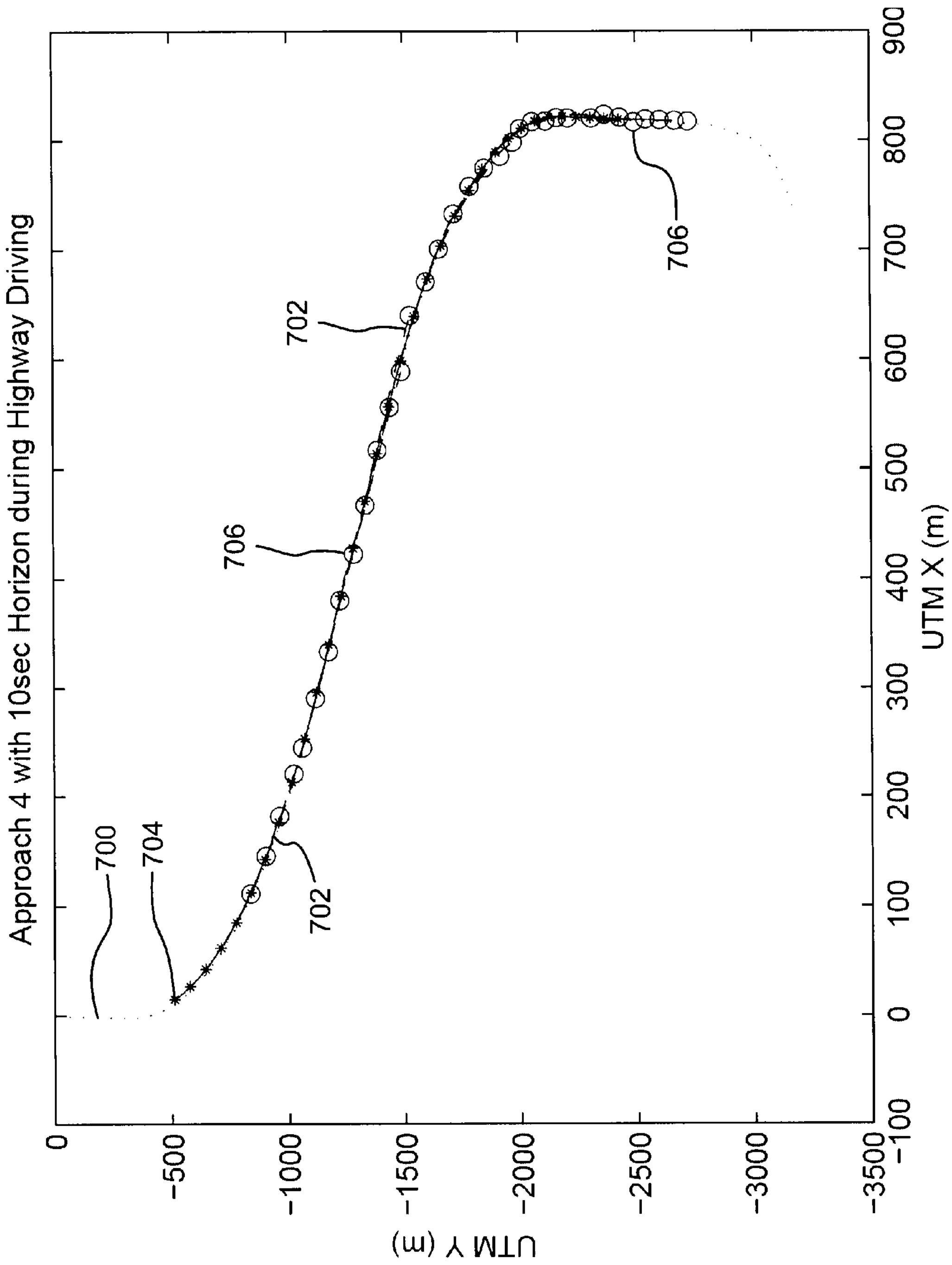
Figure 8A:
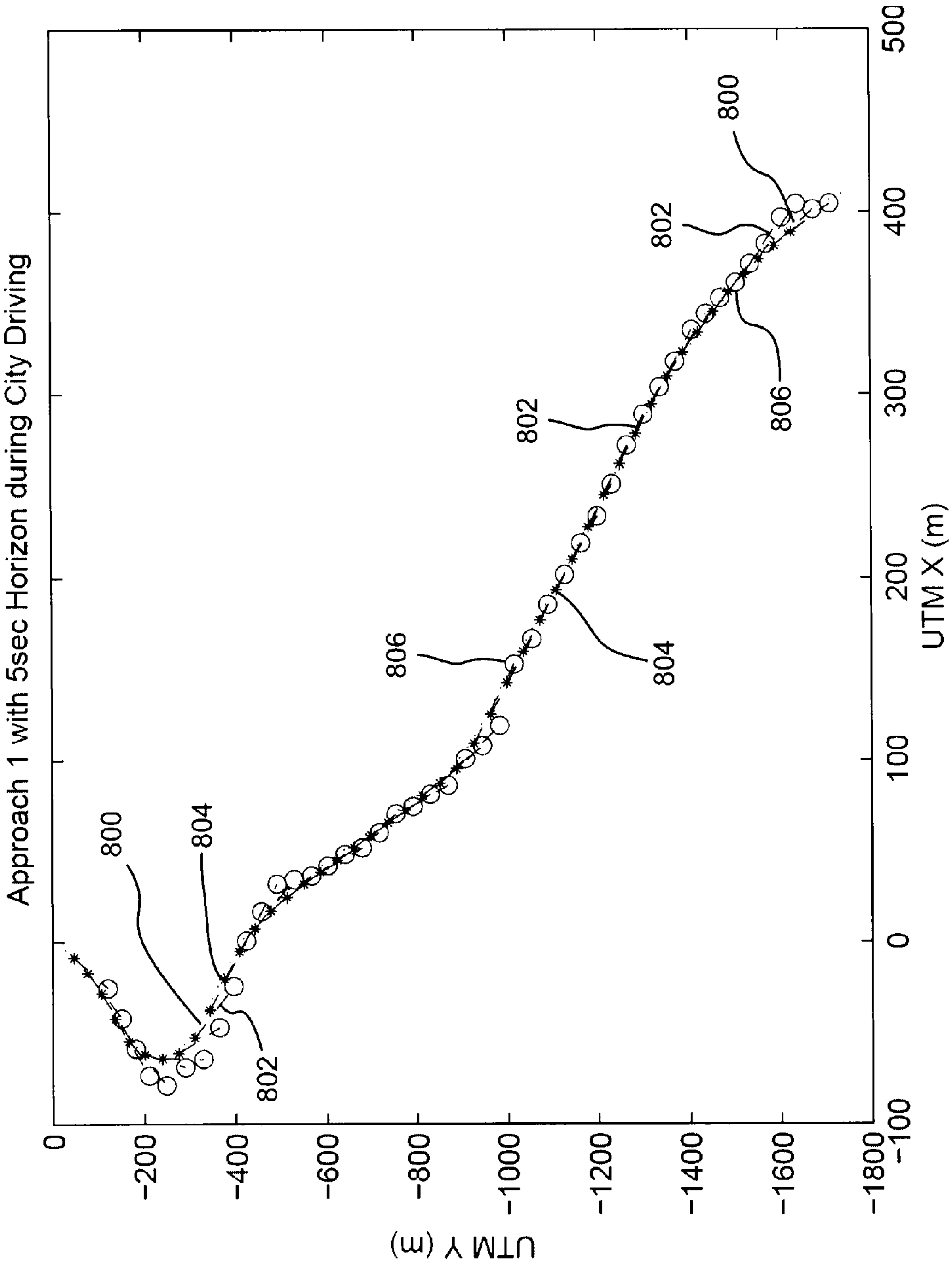
FIGS. 8*a*-8*d* show data corresponding to the city region shown in FIG. 5.
Figure 8B:
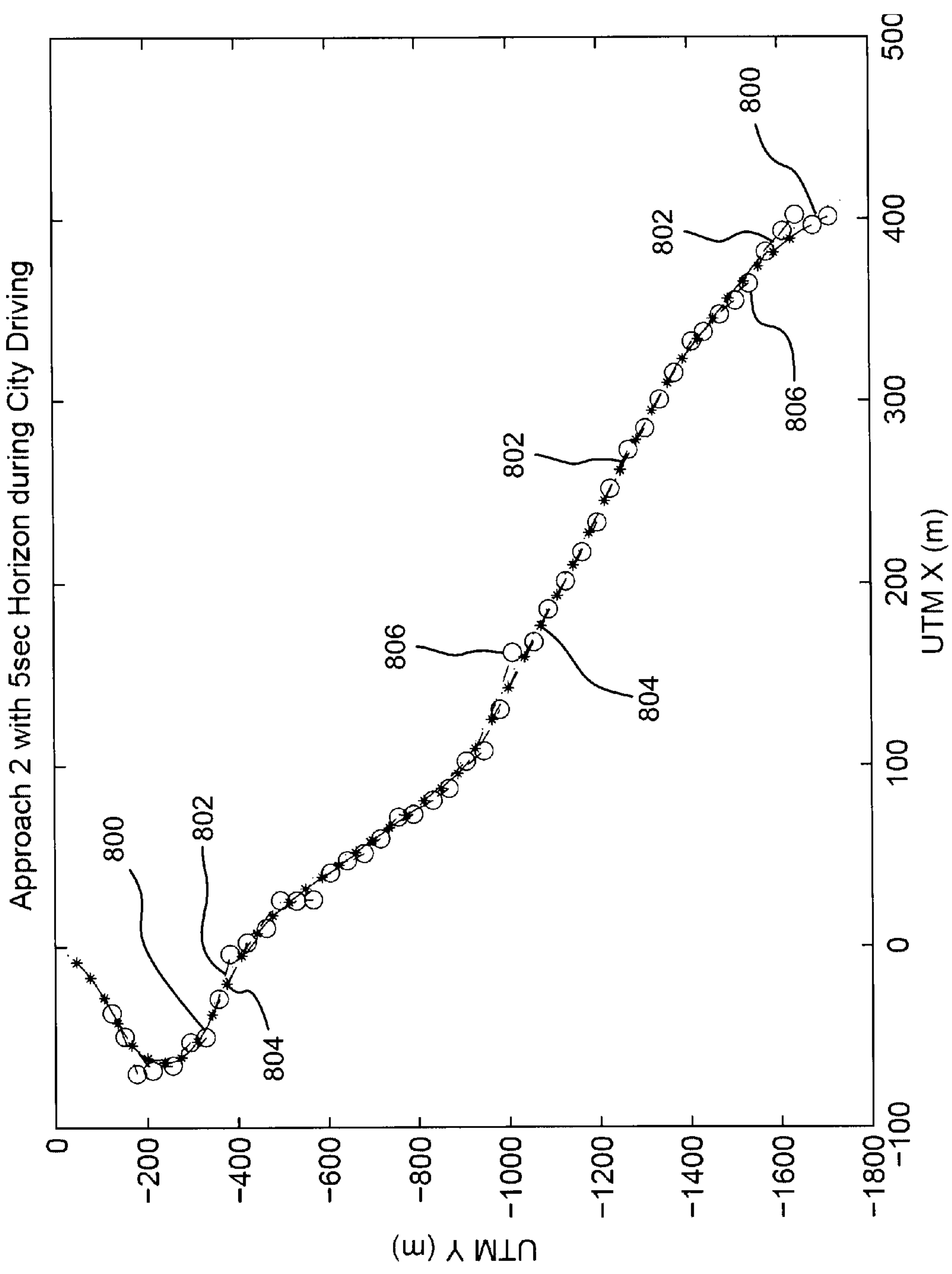
Figure 8C:
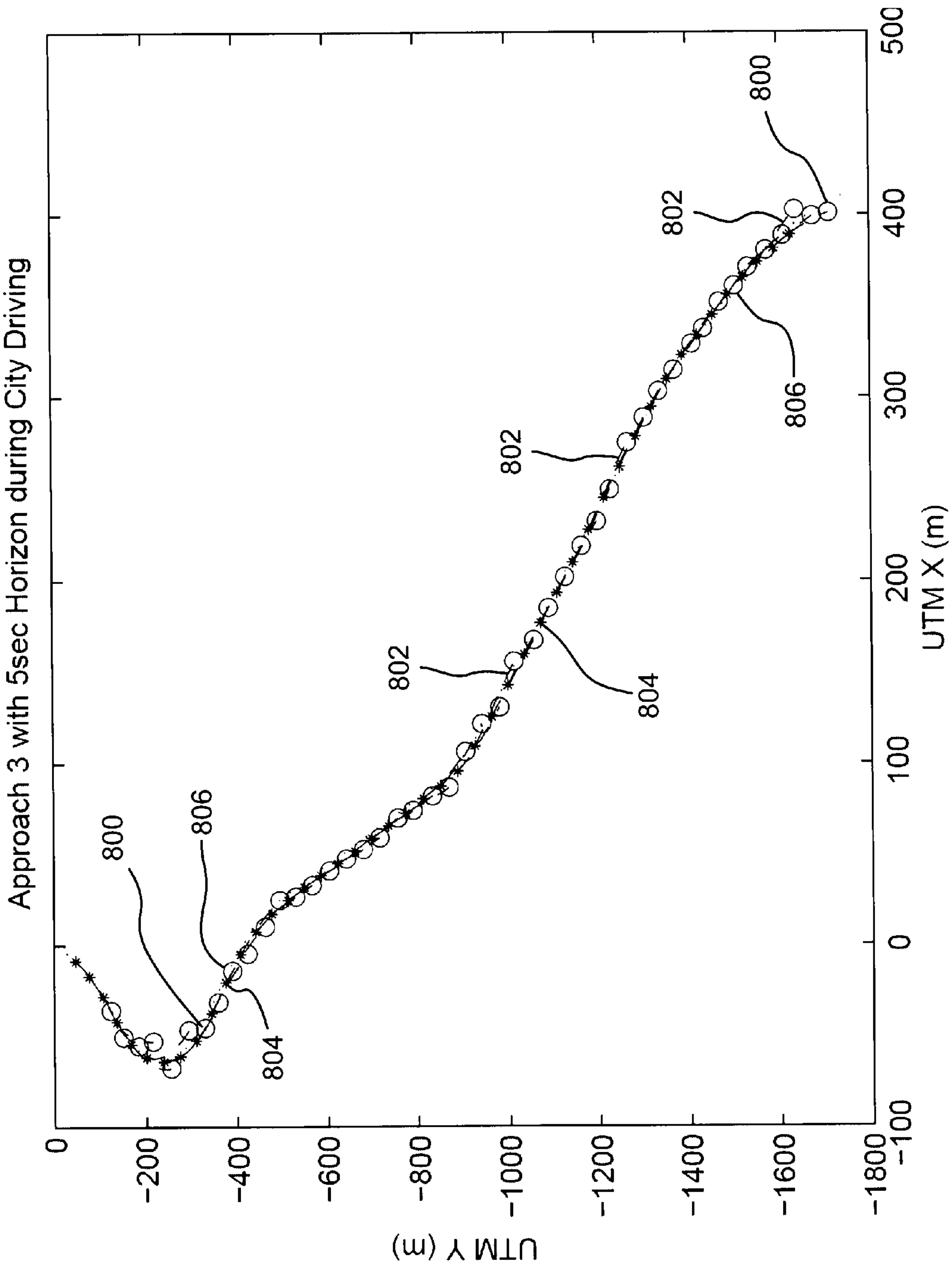
Figure 8D:
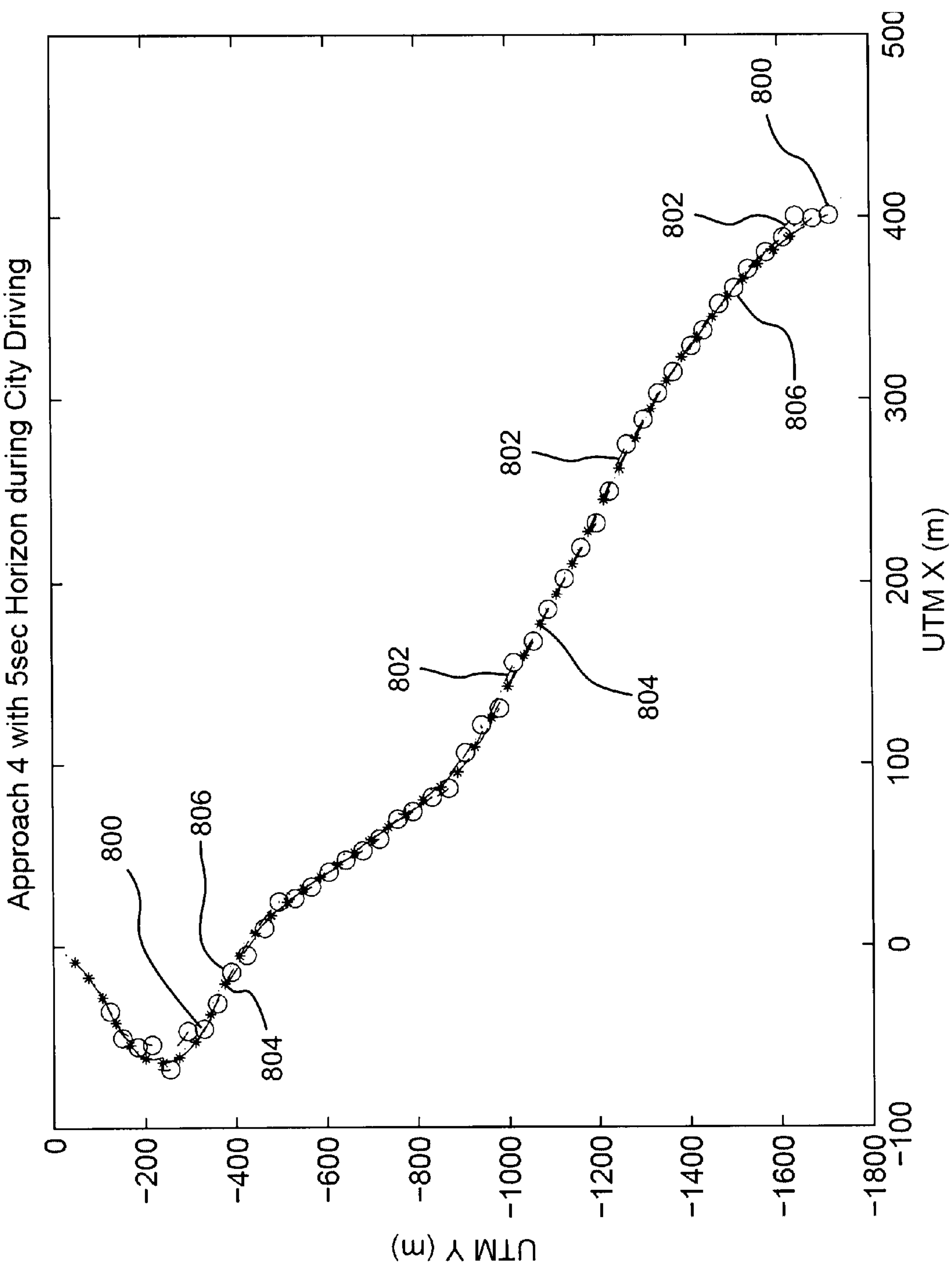
Figure 9A:
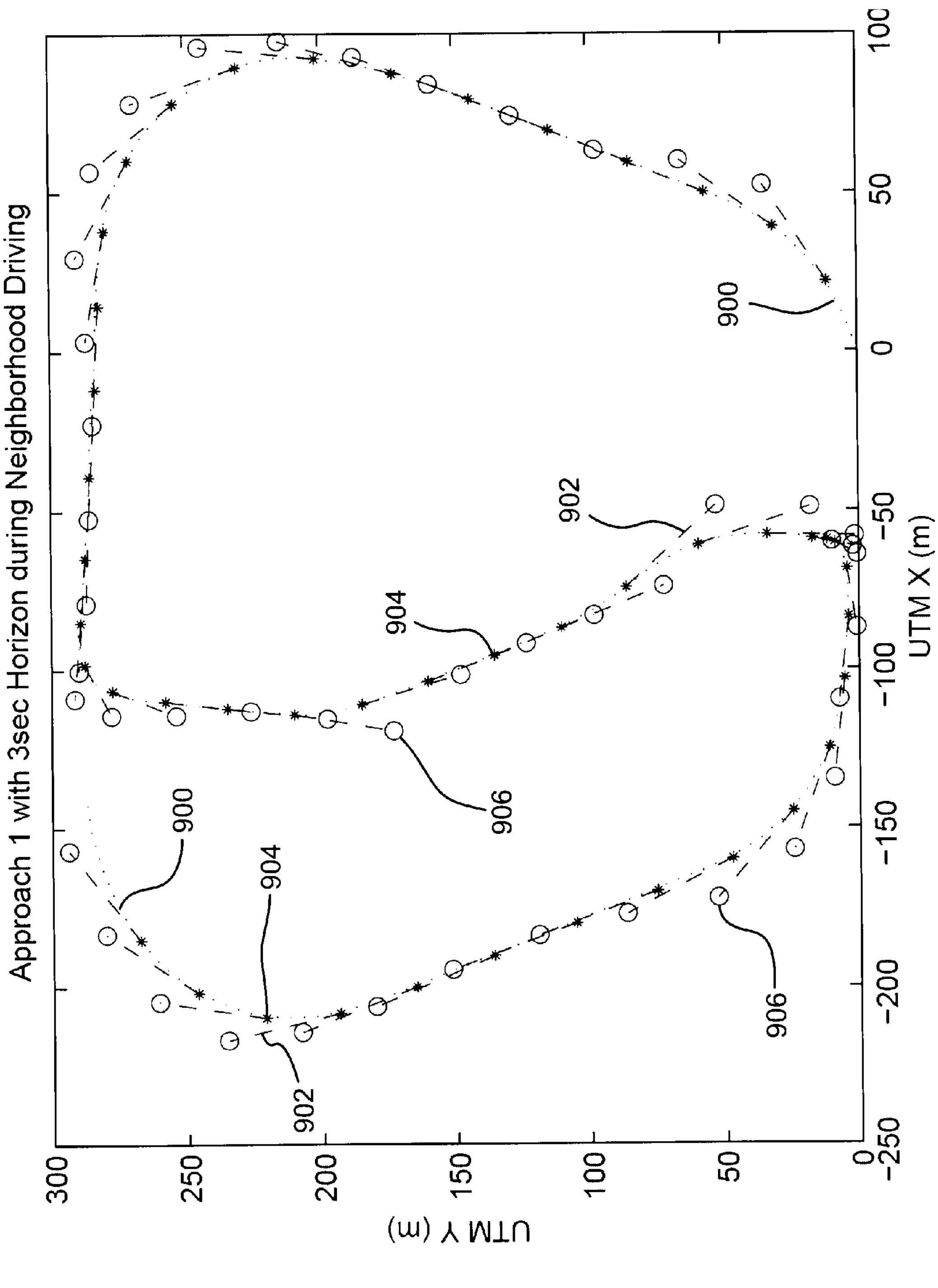
FIGS. 9*a*-9*d* show data corresponding to the neighborhood region shown in FIG. 5.
Figure 9B:
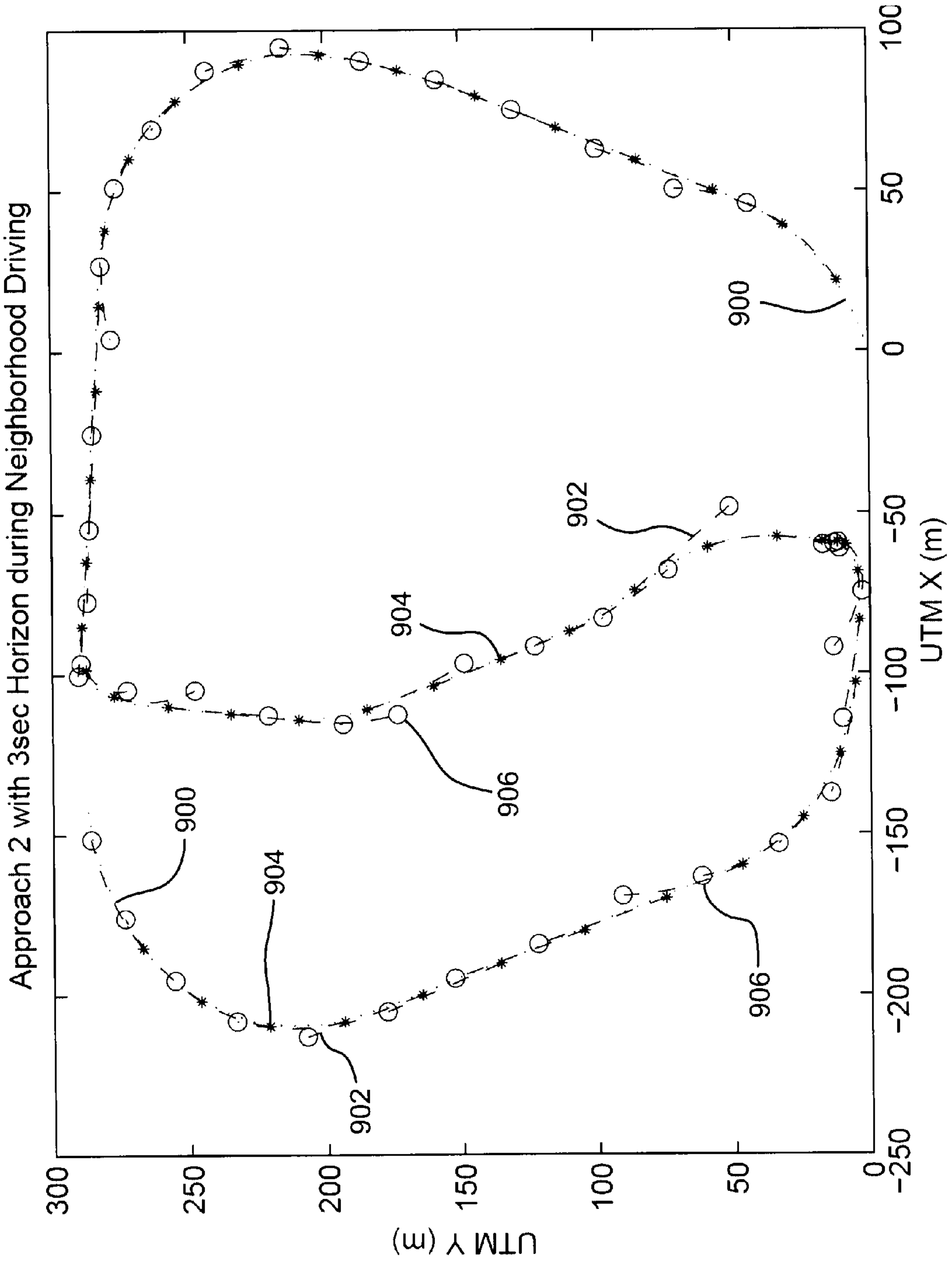
Figure 9C:
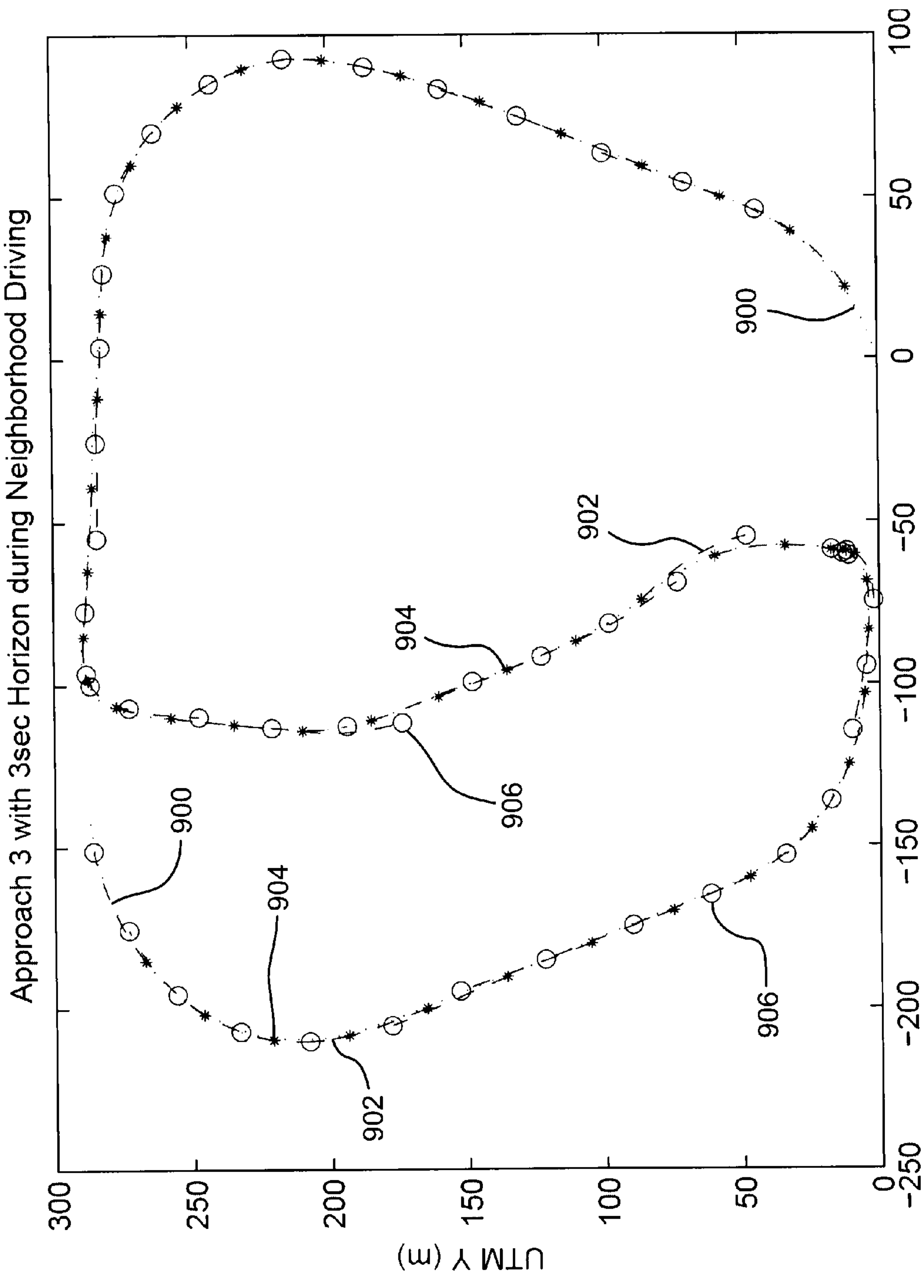
Figure 9D:
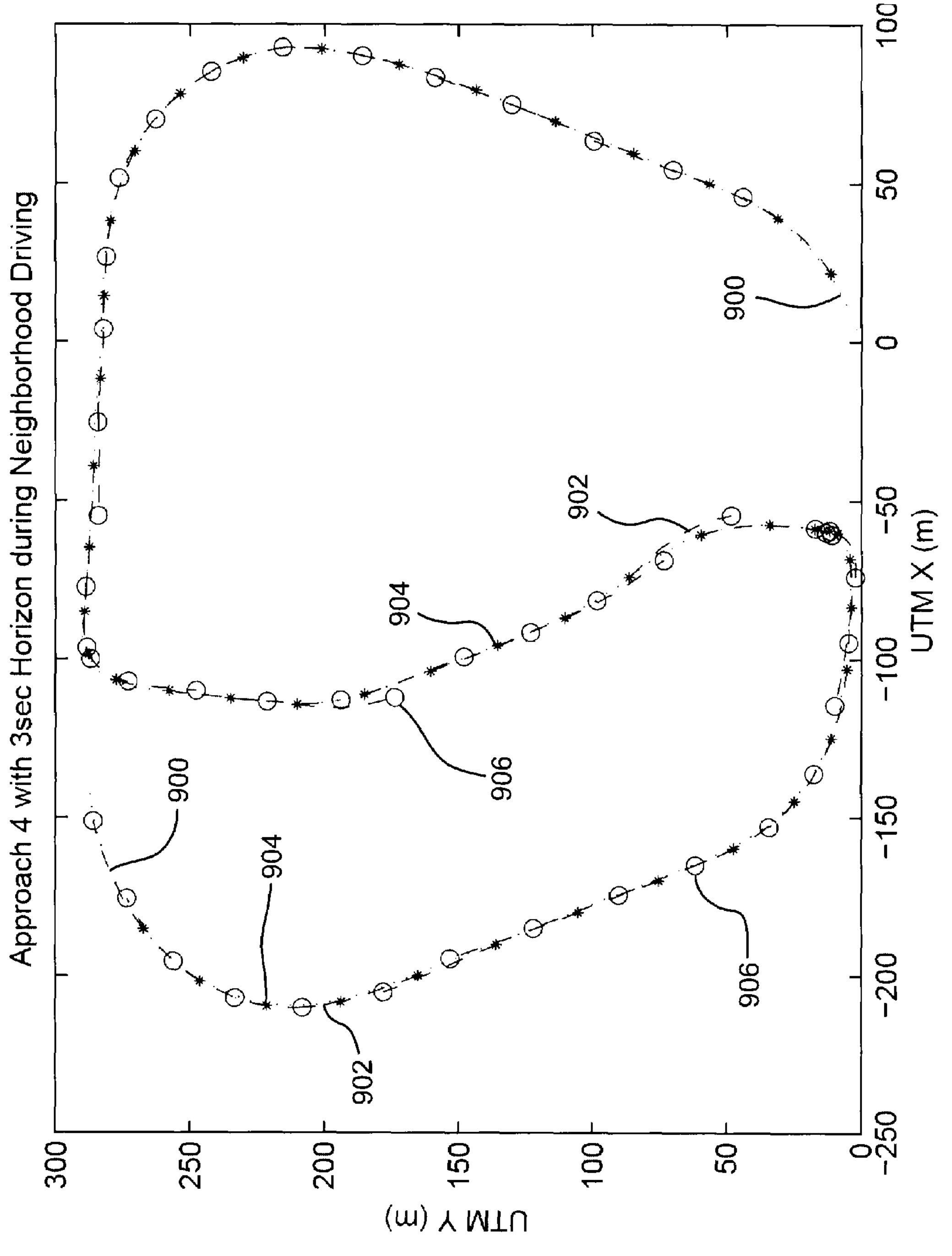

FIG. 5 shows a map 500, including a highway portion 502, a city portion 504, and a neighborhood portion 506. The highway portion 502 includes a main highway 508. The city portion 504 includes a high-speed road 510, as well as various low-speed roads 512. The neighborhood portion 506 includes low-speed roads 512.

The table shown in FIG. 6 depicts a comparison of the three different driving environments shown in FIG. 5. This table illustrates that as the average driving speed associated with the environment decreases, the accuracy of path predictions with the same time horizon also decreases. Lateral and longitudinal inputs made by drivers have a more profound effect on the path predictions at lower speeds. Thus, only shorter time horizon predictions are possible for neighborhood driving, while highways allow for longer predictions into the future. However, the inclusion of road geometry data is beneficial in all environments.

FIG. 5 shows why longer predictions can be utilized in environments where driver input is more limited. These environments (i.e., highway portion 502) that permit longer predictions of sufficient accuracy correspond to higher average vehicle speeds. In particular, the first, second, third and fourth approaches discussed above are shown in relation to highway, city and neighborhood driving in FIGS. 7-9.

FIGS. 7*a*-7*d*, respectively, represent the first to fourth approaches discussed above with 10-second predictions for the highway portion 502 of FIG. 5. FIGS. 8*a*-8*d*, respectively represent the first to fourth approaches with 5-second predictions for the city portion 504 of FIG. 5. FIGS. 9*a*-9*d*, respectively, represent the first to fourth approaches with 3-second predictions for the neighborhood portion 506 of FIG. 5.

In FIGS. 7-9, the dotted lines 700, 800 and 900 represent the centerlines of the respective road portions (respectively, highway, city or neighborhood) shown in FIG. 5. The dashed lines 702, 802 and 902 represent the predicted paths for each approach, where the stars 704, 804 and 904 represent a beginning of the predicted paths 702, 802 and 902, and the circles 706, 806 and 906 represent an end of the predicted paths 702, 802 and 902. Therefore, a lateral error in a path prediction is the distance from a circle 706, 806 or 906 to a centerline of a respective road, as noted by a respective star 704, 804 or 904. In the aspect shown in these figures, the path predictions are repeated every 200 ms.

In each of FIGS. 7-9, it should be appreciated that the predictions which include the road and lane-changing curvature are rarely visible outside an actual driven path, which is presumed to correspond to the dotted lines 700, 800 and 900 representing the centerlines of each of the respective road portions. For clarity of presentation, the figures only show every tenth prediction.

As discussed above, this disclosure proposes integrating digital map information and detected (or expected) vehicle maneuvers into 3- to 10-second path predictions. This integration is performed through numerically integrating vehicle dynamic models with expected curvature and constant longitudinal acceleration inputs. The digital map information provides expected road curvature. Additional curvature is included when vehicle maneuvers, such as lane changes, are made relative to the road geometry. The resultant predictions are more accurate in most driving situations and environments. Accurate predictions are more useful for sharing with neighbors through wireless communications.

Long-time horizon predictions are generally unacceptable for stop-and-go and aggressive highway driving without including a model for expected longitudinal driver inputs. Although the long-time horizon predictions might produce too many false alarms to warrant incorporation into cooperative safety systems, these long-time horizon predictions may have sufficient accuracy to improve traffic flow on highways by smoothing maneuvers, such as lane changing and passing.

Long-time horizon predictions are also generally unacceptable in neighborhood driving. Here again, longitudinal driver behavior is too sporadic and unpredictable. Too many environmental factors, such as obstacles, pedestrians, traffic lights, and other moving vehicles, contribute to this unpredictability. Greater modeling of the environment and the driver's response to the current state of this environment is preferred. Thus, prediction horizons should reflect the expected vehicle speed for the environment. In terms of short-time horizon predictions, although a driver at low speed can be more unpredictable and greatly influence the future path prediction, the vehicle can also respond quickly to inputs to avoid a detected collision within a short time horizon.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of vehicular path prediction for a vehicle travelling on a road, comprising:

estimating a yaw rate of the vehicle over a prediction time period, by predicting the yaw rate for a time horizon corresponding to the prediction time period, based on vehicle sensor information and map information for the road; and predicting a future path of the vehicle on the road for the prediction time period based on a speed and a direction of the vehicle, and the estimated yaw rate.

2. The method according to claim 1, wherein the map information includes a geometry for a portion of the road on which the vehicle is travelling.

3. The method according to claim 1, wherein the vehicle sensor information includes yaw rate information from a yaw rate sensor on the vehicle and location information of the vehicle relative to the map information from a positioning device on the vehicle.

4. The method according to claim 1, wherein the predicted future path of the vehicle is denoted as a vector x(t), $$\dot{x}(t) = \begin{bmatrix} \dot{x}(t) \\ \dot{y}(t) \\ \dot{\psi}(t) \\ \dot{v}_x(t) \end{bmatrix} = \begin{bmatrix} v_x(t)\cos(\psi(t)) \\ v_x(t)\sin(\psi(t)) \\ \omega(t) \\ a_x(t) \end{bmatrix},$$

x, y, and ψ are with respect to a global coordinate frame, $v_x$ and $\alpha_x$ are with respect to a vehicle fixed coordinate frame, x is a X-coordinate position in distance units, y is a Y-coordinate position in distance units, $\psi$ is a heading of the vehicle in angular units taken positive counter-clockwise from the x-axis, $v_x$ is a longitudinal velocity of the vehicle in distance units per time units, $\alpha_x$ is a longitudinal acceleration of the vehicle in distance units per time units squared, and $\omega(t)$ is the estimated yaw rate in angular units per time units.

5. The method according to claim 4, wherein $\alpha_x(t)$ is assumed to be constant over the prediction time period, denoted as T, with a value $\alpha_x(t)=\alpha_x[0]\forall t\in[0, T]$ taken from an accelerometer measurement.

6. The method according to claim 5, wherein R(t) is an instantaneous radius of curvature of the vehicle, and $\omega(t)=v_x(t)/R(t)$.

7. The method according to claim 6, wherein the instantaneous radius of curvature is the inverse of a combined curvature, which includes a road curvature based on the map information for the road and a maneuvering curvature based on a vehicle maneuver determined based on the vehicle sensor information.

8. The method according to claim 7, wherein the maneuvering curvature is based on a maneuvering time period for completing the vehicle maneuver.

9. The method according to claim 1, further comprising:

transmitting the predicted path of the vehicle to another vehicle.

10. A vehicle, comprising:

a yaw rate sensor to produce yaw rate information of the vehicle;

a positioning device to determine a global position of the vehicle relative to map information for a road; and a processing device to estimate a yaw rate of the vehicle over a prediction time period, by predicting the yaw rate for a time horizon corresponding to the prediction time period, based on vehicle sensor information including the produced yaw rate information from the yaw rate sensor and the map information for the road, and further to predict a future path of the vehicle on the road for the prediction time period based on a speed and a direction of the vehicle, and the estimated yaw rate.

11. The vehicle according to claim 10, wherein the map information includes a geometry for a portion of the road on which the vehicle is travelling.

12. The vehicle according to claim 10, wherein the predicted future path of the vehicle is denoted as a vector x(t), $$\dot{x}(t)=\begin{bmatrix}\dot{x}(t)\\ \dot{y}(t)\\ \dot{\psi}(t)\\ \dot{v}_x(t)\end{bmatrix}=\begin{bmatrix}v_x(t)\cos(\psi(t))\\ v_x(t)\sin(\psi(t))\\ \omega(t)\\ a_x(t)\end{bmatrix},$$

x, y, and $\psi$ are with respect to a global coordinate frame, $v_x$ and $\alpha_x$ are with respect to a vehicle fixed coordinate frame, x is a X-coordinate position in distance units, y is a Y-coordinate position in distance units, $\psi$ is a heading of the vehicle in angular units taken positive counter-clockwise from the x-axis, $v_x$ is a longitudinal velocity of the vehicle in distance units per time units, $\alpha_x$ is a longitudinal acceleration of the vehicle in distance units per time units squared, and $\omega(t)$ is the estimated yaw rate in angular units per time units.

13. The vehicle according to claim 12, further comprising an accelerometer, wherein $\alpha_x(t)$ is assumed to be constant over the prediction time period, denoted as T, with a value $\alpha_x(t)=\alpha_x[0]\forall t\in[0, T]$ taken from a measurement using the accelerometer.

14. The vehicle according to claim 13, wherein R(t) is an instantaneous radius of curvature of the vehicle, and $\omega(t)=v_x(t)/R(t)$.

15. The vehicle according to claim 14, wherein the instantaneous radius of curvature is the inverse of a combined curvature determined by the processing device, the processing device determining the combined curvature using a road curvature based on the map information for the road and a maneuvering curvature based on a vehicle maneuver determined based on the vehicle sensor information.

16. The vehicle according to claim 15, wherein the maneuvering curvature is based on a maneuvering time period for completing the vehicle maneuver.

17. The vehicle according to claim 10, further comprising a communication device to transmit the predicted path of the vehicle to another vehicle.

18. A computer readable medium, including computer executable instructions, wherein the instructions, when executed by a processor, cause the processor to perform a method of vehicular path prediction for a vehicle travelling on a road, the method comprising:

estimating a yaw rate of the vehicle over a prediction time period, by predicting the yaw rate for a time horizon corresponding to the prediction time period, based on vehicle sensor information and map information for the road; and predicting a future path of the vehicle on the road for the prediction time period based on a speed and a direction of the vehicle, and the estimated yaw rate.

19. The computer readable medium according to claim 18, wherein the map information includes a geometry for a portion of the road on which the vehicle is travelling.

20. The computer readable medium according to claim 18, wherein the vehicle sensor information includes yaw rate information from a yaw rate sensor on the vehicle, and location information of the vehicle relative to the map information from a positioning device on the vehicle.

* * * * *